United States Patent
Rockhill, Jr.

(10) Patent No.: US 6,173,521 B1
(45) Date of Patent: Jan. 16, 2001

(54) SPINNER BAIT HAVING MEANS FOR QUICKLY INTERCHANGING BLADES THEREOF

(76) Inventor: Henry L. Rockhill, Jr., 1216 Anna Dr., Tuscumbia, AL (US) 35674

( * ) Notice: Under 35 U.S.C. 154(b), the term of this patent shall be extended for 0 days.

(21) Appl. No.: 09/267,721

(22) Filed: Mar. 15, 1999

Related U.S. Application Data

(63) Continuation-in-part of application No. 08/779,212, filed on Jan. 6, 1997, now abandoned.

(51) Int. Cl.$^7$ .................................................. A01K 85/00
(52) U.S. Cl. ................................................... 43/42.13
(58) Field of Search ............................... 43/42.11, 42.13, 43/42.31, 42.09

(56) References Cited

U.S. PATENT DOCUMENTS

| | | |
|---|---|---|
| 800,536 | 9/1905 | Bailey et al. . |
| 2,307,200 | 1/1943 | Cullerton . |
| 2,935,809 | 5/1960 | Pratt . |
| 3,001,318 * | 9/1961 | Miller .................................. 43/42.13 |
| 4,030,225 | 6/1977 | Earley . |
| 4,183,164 | 1/1980 | Young et al. . |
| 4,617,753 | 10/1986 | Pauley et al. . |
| 4,619,067 | 10/1986 | West . |
| 4,745,700 * | 5/1988 | Davis .................................. 43/42.13 |
| 4,807,387 | 2/1989 | Dougherty, Jr. et al. . |
| 4,815,233 | 3/1989 | Pingel . |
| 4,930,247 | 6/1990 | Dubois . |
| 5,024,019 | 6/1991 | Rust et al. . |
| 5,182,876 | 2/1993 | Lewis . |
| 5,201,784 * | 4/1993 | McWilliams ........................ 43/42.13 |
| 5,381,620 | 1/1995 | Gibbs . |
| 5,412,899 | 5/1995 | Reboul . |
| 5,499,470 * | 3/1996 | Reed .................................. 43/42.13 |
| 5,605,004 | 2/1997 | Boullt et al. . |

* cited by examiner

Primary Examiner—Kurt Rowan
(74) Attorney, Agent, or Firm—Waddey & Patterson; John C. Garvin, Jr.; Harold W. Hilton

(57) ABSTRACT

A fishing lure of the spinner bait type having a coupling assembly for rapidly changing blades of one configuration for blades of another configuration. The lure is formed of two sections. The first section is a wire body provided with a first end having a hook secured thereto and a second externally threaded distal end. The second section includes a trailing blade assembly releasably secured to the first section. A quick disconnect coupling secures the trailing blade assembly to the wire body at the second, distal end thereof and permits the blade assembly to be quickly interchangeably with other blade assemblies having blades of varying configurations. Other blades mounted along the length of the body are also quickly interchangeable for blades of different configurations.

12 Claims, 2 Drawing Sheets

SPINNER BAIT HAVING MEANS FOR QUICKLY INTERCHANGING BLADES THEREOF

This is a continuation-in-part of U.S. patent application, Ser. No. 08/779,212, filed Jan. 6, 1997, abandoned as of the filing date of this continuation application.

FIELD OF THE INVENTION

The present invention relates to a quick change fishing lure, and more particularly, but not by way of limitation, to a fishing lure having means for interchanging, in a rapid and facile manner, spin blades of a different configuration, size and/or color than the spin blades then presently being used by the fisherman.

BACKGROUND OF THE INVENTION

Spinner baits for years have been one of the more reliable lures for trout and bass fishermen. Such lures typically are constructed from a number of components which can be altered either as to size, shape color or placement relative to each other. The components, however, generally include a line attaching portion, a metal spinner blade, a hook and means for attaching the hook to a wire carrier.

Because of the many combinations of individual components, a fisherman often times includes a variety of sizes, colors and configurations of spinner baits in his tackle box to insure the availability of the proper bait for the prevailing conditions. Such a requirement, however, often times results in the expenditure of significant sums of monies for a single type of spinner bait and which expenditures must be repeated for each type of lure.

Some prior lures have been capable of partial disattachment or dissembly but have been of expensive construction, whereas others have been of such construction as to make it possible, unfortunately, for one body portion of a lure to become separated from another body portion during use. Still other lure constructions make it necessary for the fisherman to disconnect the fishing line from the lure and then reconnect the fishing line to that lure or another lure when it is desired to change such characteristics of the lure relating to configuration, color, etc.

It is to overcome these disadvantages and other problems that the present invention has evolved.

SUMMARY OF THE INVENTION

As will be seen in greater detail hereinafter, the present invention relates to a fishing lure of the spinner bait type. The lure is made in two sections which are releasably connected. The first section is formed of a thin rigid wire rod and is defined herein as a wire body. The second section forms a quick disconnect blade assembly and includes a coupling member having a trailing spin blade attached thereto. The quick disconnect feature permits blades of different configurations to be rapidly interchanged without the need of disconnecting the entire lure from the fishing line. Other blades and other components carried on the wire body are also made to be individually, easily replaceable.

It is, therefore, an object of the present invention to provide a relatively low cost fishing lure utilizing a highly advantageous attachment arrangement, making it possible for blades to be interchanged for other blades, in a rapid and facile manner.

Other objects, features, and advantages will be more readily apparent from the appended drawing and text.

DESCRIPTION OF THE PREFERRED EMBODIMENTS

Figure 1:
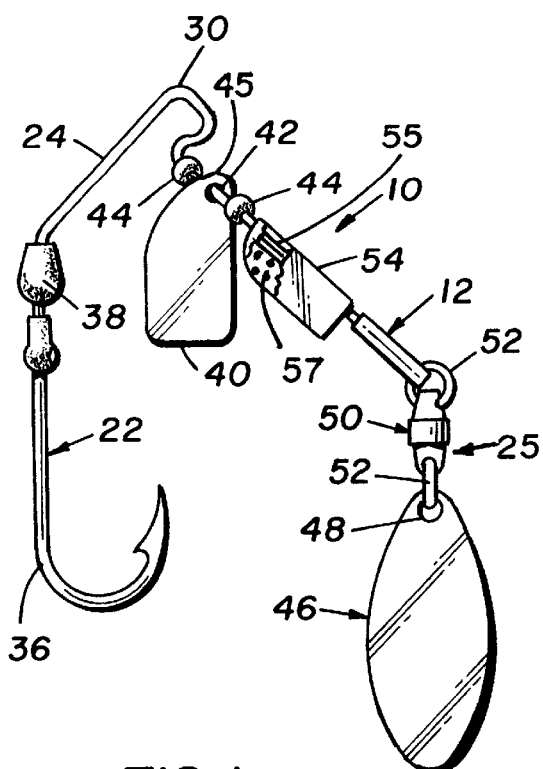
FIG. 1 is an elevational view of the fishing lure of the present invention utilizing separable body and spin blade members joined together by a releasable coupling means.
Figure 2:
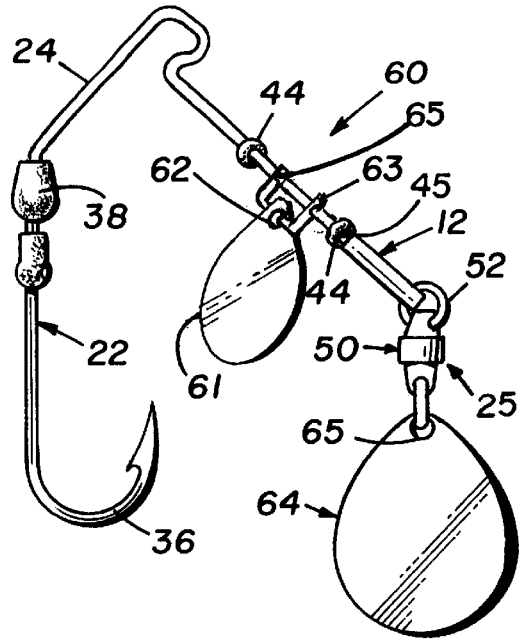
FIG. 2 is a view similar to FIG. 1 of another embodiment of the present invention.
Figure 3:
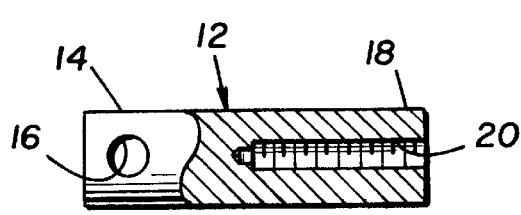
FIG. 3 is a partially sectional view of the coupling member used in the embodiments of FIGS. 1 and 2 for attaching a trailing blade to the lure body.
Figure 4:
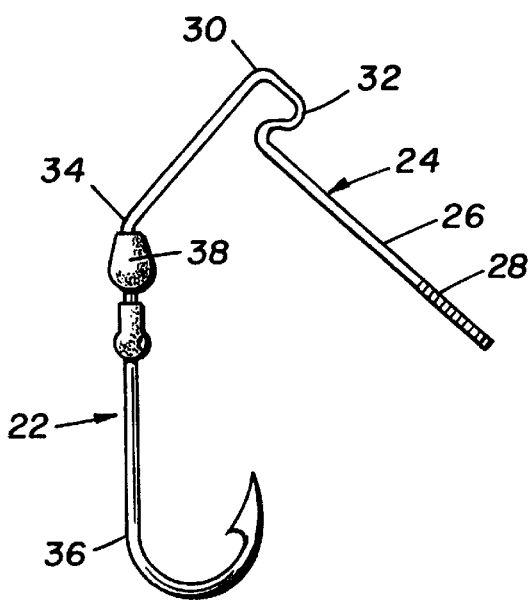
FIG. 4 is an elevational view of the wire body of FIGS. 1 and 2 and more clearly illustrates the threaded distal end of the body for attaching a trailing blade to the lure body.

As seen in FIGS. 1 and 4 a fishing lure 10 (or spinner bait) is shown to include a wire body section 24 including a rear end portion 26 having a distal end provided with external threads 28 thereon and a forward end portion 34 having a hook assembly 22 thereon. The hook assembly is shown to include weights 38 provided on the distal end of a hook 36. Hook 36 depends downwardly from the forward portion of body 24. Body 24 further includes an intermediate curved offset configuration having an extending crook or bend 32 forming a semi eyelet for attachment of a fishing line (not shown) thereto. The rear end portion and the forward end portion of wire body 24 are disposed in angular relation. FIGS. 1–3 illustrate the rear end portion and forward end portion as being in substantially normal relation. A trailing spin blade 46 is disposed for releasably secured relation to the rear distal end of body 24 (FIGS. 1 and 2). The blade is interchangeable as described hereinbelow.

A quick change blade assembly 25, which forms the second section of the lure, is provided to serve as a means for quickly changing the trailing blade 46 of the spinner bait (and thereby change the color and/or shape thereof). Quick change blade assembly 25 (FIGS. 1 and 2) includes a coupling member 12 having a swivel 50 secured thereto and blade 46 is secured to swivel 50. As best seen in FIG. 3, coupling member 12 includes a second end 14 having a radial bore 16 and a first end 18 having an internally threaded axial bore 20 for secured relation with external threads 28 of body 24. As seen in FIG. 3, bores 16 and 20 are in spaced relation. Swivel 50 is shown to have one end secured to an eyelet member 52 which is secured in radial bore 20. Blade 46 is secured to another eyelet 52 which is secured to the opposite end of swivel 50. As seen in FIG. 3 coupling member 12 is a solid member.

To change the blade 46 to one of a different shape and/or color it is only necessary to rotate the coupling member 12 relative to body 24 to unscrew the coupling member of the blade assembly from threaded end of body 24. Of course, it is only necessary to screw another similar blade assembly having different size, shapes or colors to the threaded end of body 24 to attach a different blade thereto.

In the embodiment of FIG. 1, lure 10 is shown to be further provided with a rattle member comprising a center blade 54 having an axial opening 55 extending therethrough. Blade 54 may have metallic members 57 therein to produce a rattling effect. A leading blade 40 is mounted forwardly of blade 54 on section 26 of body 24. Leading blade 40 (which may be of the type typically known as a Colorado blade) includes an opening 42 through which section 26 of body 24 extends, a plurality of spacer beads 44 having axial openings 45 therethrough is also mounted on section 26 on opposite sides of blade 40. Section 26 extends through opening 45. The beads may be colored to add a colorant to the lure.

FIG. 2 illustrates another embodiment of the present invention wherein like reference numerals refer to like parts. As seen in FIG. 2, a fishing lure designated by the numeral 60 includes a clevis 63 for rotatably securing a leading blade 61 to body 24. Clevis 63 is a U-shaped member having an opening 65 disposed at each end of each leg of the U-shaped member. The clevis is rotatable on body section 26 and extends through an opening 62 in blade 61 to rotatably secure the blade 61 to the body 24. A spacer bead 44 is provided on each side of the clevis 63, for reasons explained supra. A trailing blade 64 is connected to swivel 50 which is in turn connected to the threaded end of body 24 in the manner described above. The embodiment of FIG. 2 is substantially the same as the embodiment of FIG. 2 except blades 40 and 54 are not used and clevis 63 and blade 61 is used.

Figure 5:
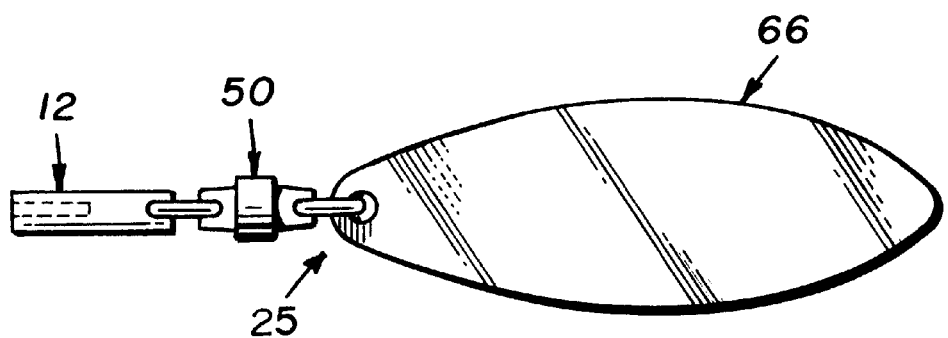
FIGS. 5–7 illustrate the blade assembly as used in FIGS. 1 and 2 having blades of different configurations.
Figure 6:
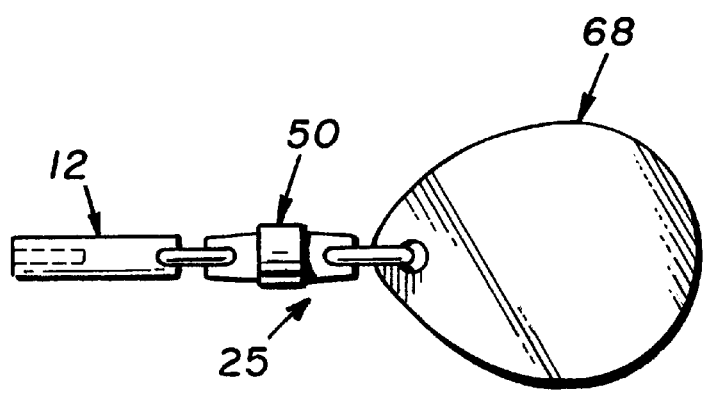
Figure 7:
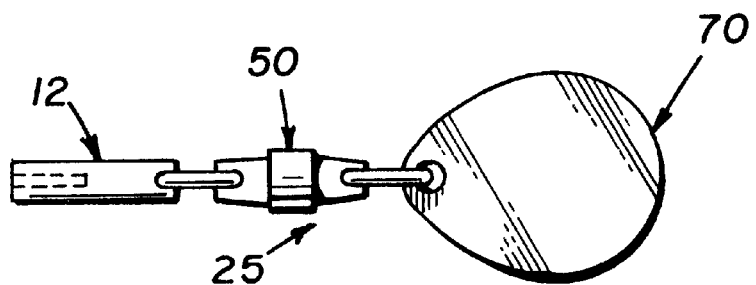

FIGS. 5, 6 and 7 illustrate the blade attachment assembly 25 having blades of different configurations and/or colors thereon. FIG. 5 illustrates a somewhat elongated blade 66 having a tear-drop configuration. FIG. 6 illustrates a blade 68 having a substantially oval configuration. FIG. 7 illustrates a blade 70 some similar to the blade of FIG. 6 but smaller in size. It is to be understood that these blade are for illustrative purposes and the present invention is not limited thereto since blades of other configurations and sizes may be resorted to if desired.

It is also to be understood that a plurality of blade assemblies are to be preassembled for carrying in a fishing tackle box. Each preassembled blade assembly, is comprised of the swivel 50 and eyelets 52. The blades of each preassembled blade assembly is provided with a different configuration. In addition, each blade may, if desired, be provided in a variety of colors.

Additionally it can be readily seen and appreciated that the blades, beads and clevis may be slid on the body to the desired location, since the wire body section 26 may be inserted through the respective openings, discussed supra, in these components. Such construction allows these components to be independently or collectively slid off the body and changed with other blades of different configurations and/or colors.

While specific embodiments of the present invention have been shown and described herein it is to be understood that various modifications thereof may be resorted to that is within the spirit and scope of the appended claims. For example, while the quick disconnect means is shown to include a threaded connection between the wire body and the coupling member (sleeve 12) other types of connectors may be resorted to, such as bayonet type connectors wherein a male member is insertable and held in a female member by friction or engagement with an internal shoulder in the female member.

I claim:

1. A fishing lure of the spinner bait type having means for changing in a rapid and facile manner, a spin blade of one type for a spin blade of another type, said lure comprising:

first and second releasably joined sections;

said first section including a wire body having a first and second end portions and an intermediate joining section having an offset curved configuration, said curved configuration including an extending portion for attachment of a fishing line thereto;

said first portion having a hook secured thereto, and depending therefrom, said second end portion of said first section having a distal end provided with external threads thereon;

said second section of said lure including a quick change assembly including a trailing spin blade, said assembly including a coupling member defined by a sleeve having a solid body and a first end provided with an internally threaded axial bore to receive said external threads of said distal end of said first section in releasably secured relation therein, and a second end having a swivel receiving transverse bore therethrough, said bores being in spaced relation, a swivel having a first end for attachment in said transverse bore of said coupling member and a second end for attachment of said trailing spin blade thereto.

2. A fishing lure as in claim 1 including a second spin blade disposed for spinnably mounted relation on said wire body between said intermediate portion and said second end portion.

3. A fishing lure as in claim 2 including a rattle member disposed for spinnably mounted relation on said wire body between said intermediate portion and said second end portion, adjacent said second spin blade, to produce a rattling noise.

4. A fishing lure as in claim 3 including a pair of spacers disposed for slidable, mounted relation on said wire body on opposite sides of said second spin blade.

5. A fishing lure as in claim 4 wherein said spacers are provided with predetermined colors to add different colors to said lure.

6. A fishing lure as in claim 3 wherein said rattle member comprises a center blade having metallic elements therein and an axial opening therethrough, said wire body extending through said axial opening for support or rattle member thereon.

7. A fishing lure as in claim 1 wherein said first end portion of said wire body is provided with a substantially straight configuration and said second end portion of said wire body is provided a substantially straight configuration, said first and second end portions of said wire body being disposed in angular relation.

8. A fishing lure as in claim 7 wherein said first and second end portions of said wire body are in substantially normal relation.

9. A fishing lure of the spinner bait type having means for changing in a rapid and facile manner, a spin blade of one type for a spin blade of another type, said lure comprising:

first and second releasably joined sections;

said section including a wire body having first and second end portions and an intermediate joining section having an offset curved configuration, said curved configuration including an extending portion for attachment of a fishing line thereto;

said first end portion having a hook secured thereto, and depending therefrom, said second end portion of said first section having a distal end provided with external threads thereon;

said second section of said lure including a quick change assembly including a trailing spin blade, said assembly including a coupling member defined by a member having a first end provided with an internally threaded axial bore to receive said external threads of said distal end of said first section in releasably secured relation therein, and a second end having a transverse bore therethrough, a swivel having a first end for attachment in said transverse bore of said coupling member and a second end for attachment of said trailing spin blade thereto;

a second spin blade disposed for spinnably mounted relation on said wire body between said intermediate portion and said second end portion; and a rattle member disposed for spinnably mounted relation on said wire body between said intermediate portion and said second end portion, adjacent said second spin blade, to produce a rattling noise.

10. A fishing lure as in claim 9 including a pair of spacers disposed for slidable, mounted relation on said wire body on opposite sides of said second spin blade.

11. A fishing lure as in claim 10 wherein said spacers are provided with predetermined colors to add different colors to said lure.

12. A fishing lure as in claim 11 wherein said rattle member comprises a center blade having metallic elements therein and an axial opening therethrough, said wire body extending through said axial opening for support or rattle member thereon.

* * * * *